Aug. 22, 1939.　　　F. H. BANBURY　　　2,170,396
TEMPERATURE-CONTROLLING MEANS FOR RUBBER MILL PANS OR THE LIKE
Filed Feb. 7, 1938　　　2 Sheets-Sheet 1
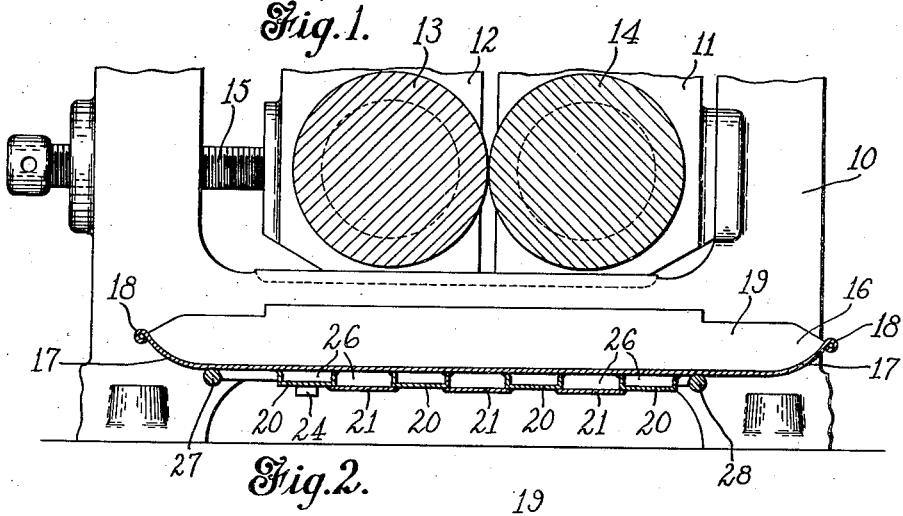
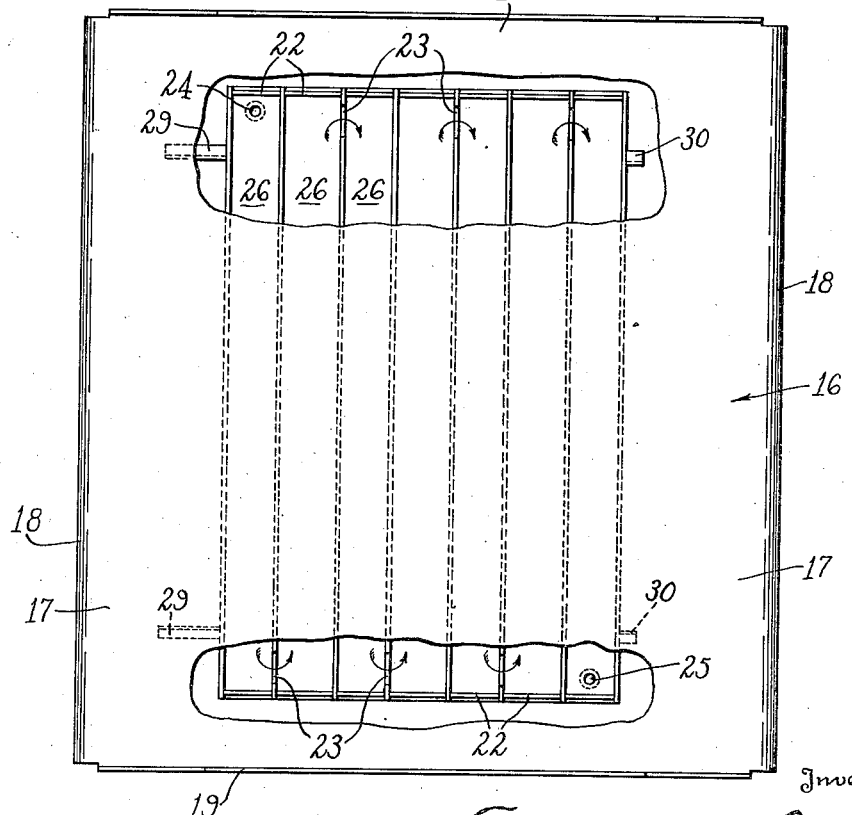
Inventor
Fernley H. Banbury
By Rockwell-Bartholow
Attorneys

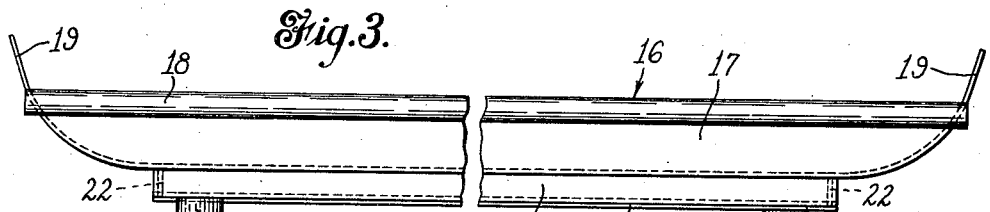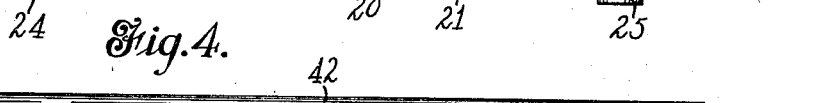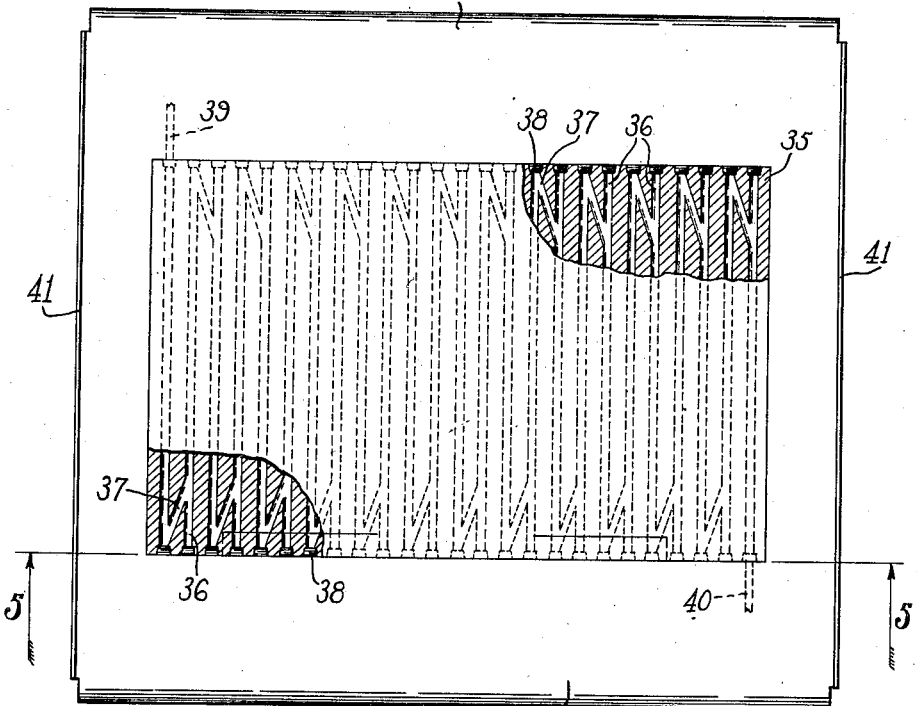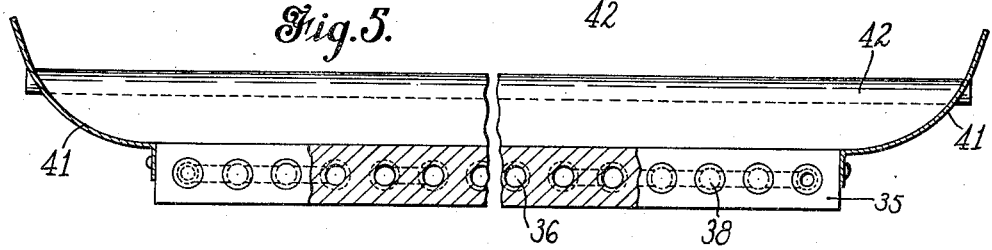

Patented Aug. 22, 1939

2,170,396

UNITED STATES PATENT OFFICE 2,170,396

TEMPERATURE-CONTROLLING MEANS FOR RUBBER MILL PANS OR THE LIKE

Fernley H. Banbury, Woodmont, Conn., assignor to Farrel-Birmingham Company, Inc., Derby, Conn., a corporation of Connecticut Application February 7, 1938, Serial No. 189,183

8 Claims. (Cl. 18—2)

This invention relates to rubber or like mills, and more particularly to such a mill employing co-acting rolls and a pan or other receptacle below the rolls to receive material which has been passed through or acted on by them.

In the operation of such devices, and particularly in the operation of rubber mills, the charge of stock acted on by the rolls becomes heated, and it is desirable to provide means for the absorption of a portion of this heat so as to cool the charge. In the present invention this has been accomplished by providing for the passage or circulation of a fluid in heat-conducting relation with the pan or other receptacle which from time to time receives the material passing through the rolls. The temperature of the circulating fluid or other medium may be so controlled that the required amount of heat will be absorbed and the charge or stock will be kept at the desired temperature. It will, of course, be understood that if in any case it is desirable to heat the charge or stock instead of cooling it, the temperature of the circulating fluid may be so controlled as to effect this result as well.

One object of the invention, therefore, is the provision of means to provide for a circulation of a fluid in heat exchange relation with the pan or receptacle situated below the rolls of a rubber mill or the like, so as to regulate the temperature of material dropping upon this receptacle from the rolls.

A still further object of the invention is the provision of a rubber mill having below the rolls a pan to receive the material passed therethrough, and means for maintaining a cooling fluid in heat exchange relation with the pan to absorb heat from the material acted upon by the rolls and falling upon the pan.

A still further object of the invention is the provision in combination with the pan of a rubber mill or the like of a plurality of passages providing for the circulation of a cooling fluid in heat exchange relation with the pan.

The invention also has for its object the provision of a plurality of interconnecting passages arranged below the pan of a rubber mill whereby a fluid may be circulated through such passages in heat exchange relation with the pan so as to control the temperature of the charge or stock acted upon by the rolls and dropping upon the pan.

To these and other ends the invention consists in the novel features and combinations of parts to be hereinafter described and claimed.

In the drawings:

Fig. 1 is a sectional view of a rubber mill having a pan embodying my invention;

Fig. 2 is a top plan view of the pan with some parts broken away for the sake of clearness;

Fig. 3 is an end elevational view of the pan;

Fig. 4 is a view similar to Fig. 3, showing a modified form of cooling device; and Fig. 5 is a sectional view on line 5—5 of Fig. 4.

To illustrate a preferred embodiment of my invention, I have shown in a somewhat conventional manner a rubber mill having a side frame 10 within which are carried journal boxes 11 and 12 supporting cooperating rolls 13 and 14. The journal box 12 is movably mounted in the frame 10, so that the roll 13 carried by this journal box may be moved toward and from the roll 14 by means of the threaded adjusting screw 15 supported by a part of the frame 10.

Disposed below the rolls 13 and 14 is the usual pan 16, which may be of any desired form and supported either in a horizontal position, as shown in Fig. 1 of the drawings, or, as is sometimes the case, in an inclined position. As illustrated, the pan 16 is horizontally disposed, and is provided with upwardly projecting end portions 17 having rolled edges 18, and also provided with upwardly extending sides 19. It will, of course, be understood that the particular shape or disposition of the pan just described may be varied without departing from the spirit of the invention.

It is very often desirable to control within limits the temperature of the stock acted upon by the rolls. In the case of rubber mills, for example, the stock becomes very hot, and it is desirable, therefore, to cool it. In other cases it might be desirable to heat the stock, and the arrangement which I am about to describe may, of course, be used for circulating either a heating or a cooling medium in heat exchange relation with the pan, so as to control properly the temperature of the stock which from time to time drops thereon from the rolls. In order to effect this result, I have shown in Figs. 1 to 3 one form of means for providing for temperature control of the stock.

In the particular form illustrated in these figures, a plurality of channel members 20 are secured upon the bottom of the pan 16, with the open side of the channel facing the pan, so that when these members are secured in place, closed fluid passages between the channel members and the pan are produced. The spaces between the channel members may be bridged by plates 21 so as to form additional fluid passages between the channel members 20, the ends of all of the passages being closed by end members 22, shown more especially in Fig. 3. The side walls of the channel members are provided with openings 23, the openings in adjacent side walls being provided at opposite sides of the pan 19, so that one of the passages, for example, formed by a plate 21, will communicate at one end with a passage formed by the channel member 20 at one side, and at the other end with a passage formed by the channel member 20 at the other side.

The channel member 20 at one end of the series is provided with an inlet opening 24, while the channel member at the other end of the series will be provided with an outlet 25, the outlet 25 preferably being placed upon the opposite side of the pan from the outlet 24. From the above description in connection with Figs. 1 and 2 of the drawings, it will be apparent that there will be arranged below and in heat exchange relation with the pan 16, a plurality of fluid passages 26 so connected as to form in effect a continuous passage of sinuous form, the cooling medium entering at one end of the first passage 26, and after traversing this passage, passing over into the other end of the adjacent passage 26, and so on until all of the passages have been traversed, when the medium is discharged through the outlet passage 25. It will be apparent, therefore, that a continuous circulation of the cooling medium is provided for in heat exchange relation with the pan, so as to control the temperature of the charge or stock dropping thereon.

The pan 16 may be supported in any desired manner. As shown, it rests upon supporting rods 27 and 28 secured in the side frame 10, and in the similar side frame (not shown) at the other side of the machine. In the form of my invention illustrated, it will be noted that the channel members 20 and plates 21 forming the fluid passages are not co-extensive with the lower surface of the pan, but are arranged upon that portion of the pan upon which the charge will ordinarily drop. Variation in this respect may, of course, be resorted to, and the entire under surface of the pan covered if desired. Spacing members in the form of angle irons 29 and 30 may be secured at the lower surface of the pan between the outer channel members 20 and the rods 27 and 28, so that the outer edges of these members will fit snugly between the rods 27 and 28, and hold the pan securely in position.

Suitable means (not shown) may be employed for forcing a temperature-controlling fluid into the opening 24. This fluid may, of course, be water, which may be hot or cold, depending upon whether it is desired to cool or heat the pan 16 and the charge of material or stock falling thereon. It will be obvious that when the fluid is forced through the inlet opening 24 into the first passage or chamber 26, it traverses the length of this passage and passes through the opening 23 into the adjacent passage 26, which it traverses, and then is led into the next succeeding passage, and so forth, until discharged through the outlet opening 25. This provides for the circulation of the entire quantity of the temperature-controlling medium, and provides for effective heat exchange between this medium and the pan 16.

In Figs. 4 and 5 I have shown a modified form of my invention wherein the pan or support for the material below the rolls may comprise the upper surface of a relatively thick plate 35 having a plurality of parallel transverse bores 36 extending through the edges thereof. Adjacent bores may be connected at alternate ends by the bores 37 drilled through the ends of the bores 36 at an angle thereto. The ends of the bores 36, as well as the bores 37, may then be closed by a plug or the like 38, which may be threaded into the plate 35 or secured in the ends of the bores 36 in any desired way. It will be seen that this arrangement also provides a circuitous passage or chamber in the plate 35 or below the upper surface of the supporting pan, and if a cooling fluid, for example, is passed through the circuitous passage provided by the communicating parallel bores, the charge of material resting on the upper surface of the plate 35 will be effectively cooled.

The bore 36 at one end of the plate may be provided with an inlet means 39, and the opposite end of the bore at the other end of the plate may be provided with an outlet means 40, through which the temperature-controlling medium may be forced through the plate by any suitable impelling means (not shown).

If desired, the plate 35 may be provided with upwardly projecting curved sides 41 and end members 42, so as to provide a structure similar to the usual metal pan provided below the mill. It will, of course, be understood that the plate 35, as well as the pan 16, will usually be formed of iron, steel or some heat-conducting material, so that the circulation of the temperature-controlling fluid through the passages provided therefor will effectively control the temperature of the upper surface of these members upon which the stock lies.

The pan, if made in the ordinary form, without the addition of water channels, might also be cooled by directing a spray of cooling fluid against the under surface of the pan. This fluid would preferably be water, and if it was desired to heat the pan instead of cool it, hot water or steam could be employed. In such case suitable means would be provided to carry off the water after it had been directed upon the pan and cooled the same, which might be in the form of an open drain to carry the waste water.

While I have shown and described some preferred embodiments of my invention, it will be understood that it is not to be limited to all of the details shown, but is capable of modification and variation within the spirit of the invention and within the scope of the appended claims.

What I claim is:

1. A rubber or like mill having cooperating rolls, supporting means below said rolls having a substantially plane upper surface to receive material therefrom, and means providing a fluid chamber below, and in heat exchange relation with, said supporting means.

2. A rubber or like mill having cooperating rolls, a pan below said rolls to receive material upon its upper surface after discharge from the rolls, and means for cooling said pan, said means comprising means for circulating a cooling fluid in heat exchange relation with the pan.

3. A rubber or like mill having cooperating rolls, a pan mounted below the rolls to receive material therefrom, means providing a circuitous fluid passage below the upper surface thereof, and in heat exchange relation therewith whereby a temperature-controlling fluid may be circulated in a circuitous path in heat exchange relation with the pan.

4. A rubber or like mill having cooperating rolls, a pan below the rolls to receive material discharge therefrom, means below the upper surface of said pan providing a plurality of parallel fluid passages, the inner ones of said passages communicating with the adjacent passages at opposite ends thereof, and the outer of said passages being provided with fluid inlet and outlet means whereby a temperature-controlling fluid may be circulated in a circuitous path in heat exchange relation with the pan.

5. A rubber or like mill having cooperating rolls, a pan below the rolls to receive material therefrom, means cooperating with the under surface of said pan to form a chamber to contain a temperature-controlling fluid in heat exchange relation with the pan, and inlet and outlet means for said chamber whereby the fluid may be circulated therethrough.

6. A rubber or like mill comprising cooperating rolls, a pan mounted below said rolls to receive material therefrom, a plurality of channel-shaped members mounted below the pan in parallel relation to form with the pan a plurality of parallel fluid passages, means for interconnecting the said passages, and certain of said passages being provided with inlet and outlet means whereby a temperature-controlling fluid may be circulated therethrough.

7. A rubber or like mill having cooperating rolls, means below said rolls for receiving material therefrom, said means comprising a plate of heat conducting material, a plurality of parallel passages in said plate, means for interconnecting said passages whereby a temperature-controlling fluid can be circulated therethrough, and one of said passages being provided with inlet means and another being provided with outlet means.

8. A rubber or like mill having cooperating rolls, a pan below said rolls for receiving material therefrom, a plurality of channel members secured at the bottom of said pan, said channel members cooperating with the lower surface of the pan to form fluid passages, and being disposed in spaced parallel relation, means for closing the spaces between said channel members to form additional passages therebetween, and means providing communication between adjacent passages whereby a fluid may be circulated through the passages, the outer passage at one side being provided with inlet means and the outer passage at the other side being provided with outlet means for the fluid.

FERNLEY H. BANBURY.